Dec. 28, 1965   J. F. MOULIN ET AL   3,225,588
DENSIMETERING SYSTEMS

Filed Oct. 12, 1962   4 Sheets-Sheet 1

Jacques Fernand Moulin
Claude Lucien Bournazel
INVENTORS

BY Michael P. Breston
ATTORNEY

Jacques Fernand Moulin
Claude Lucien Bournazel
INVENTORS

BY Michael P. Breston

ATTORNEY

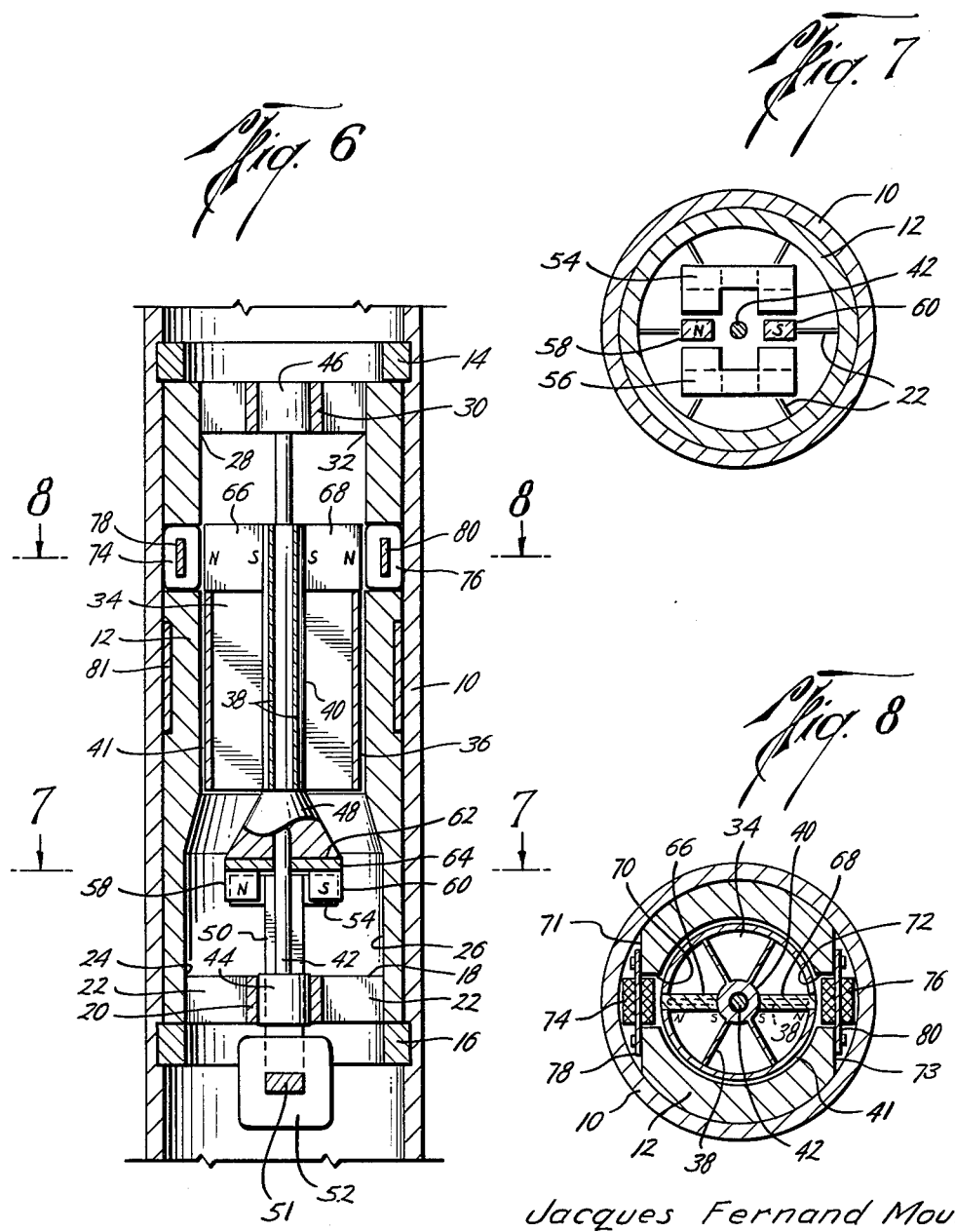

United States Patent Office 3,225,588
Patented Dec. 28, 1965

3,225,588
DENSIMETERING SYSTEMS
Jacques Fernand Moulin and Claude Lucien Bournazel, Paris, France, assignors to Societe de Prospection Electrique Schlumberger, S.A., Paris, France, a corporation of France
Filed Oct. 12, 1962, Ser. No. 230,224
9 Claims. (Cl. 73—32)

This invention relates generally to densimetering systems and more particularly to densimetering systems of the type employing an elastically suspended, hollow, vibratory body.

Densimetering systems of the type employing an elastically suspended, hollow, vibratory body are generally known. The resonant frequency of such a vibrating body varies as a function of the density of the fluids passing through the body. This resonant frequency, can be easily converted into a corresponding electrical signal whose frequency can be measured with great precision. From a knowledge of the frequency of the electrical signal, it is possible to obtain accurate density measurements. Known densimeters based on the above principle, while performing satisfactorily under controlled laboratory conditions, fail to provide accurate density measurements under unfavorable environmental conditions, such as are typically found, for example, in oil wells. Thus, prior art densimeters are not readily adaptable to measure the density of fluids such as may be expected to flow through a packer instrument. The great need for a rugged, logging densimeter of the elastically suspended, vibratory body type, which could be housed in a packer tool, remained unsatisfied until the invention of the presently disclosed densimeter.

Specifically, the major obstacles encountered in the field during the employment of known densimeters are:

(1) When the measured fluid is under high pressure (on the order of, say, several hundred kilograms per square centimeter, as is frequently encountered in deep oil wells), it becomes necessary to increase the thickness of the wall of the hollow, vibratory member by an amount which greatly decreases the sensitivity of the densimeter;

(2) The elastically suspended, vibratory member, by affording a relatively great restriction upon the flow of the measured fluid, imposes a high-pressure drop which is unacceptable in many installations;

(3) Because, as is well-known, the elastic properties and hence the resonant frequencies of suspended, vibratory members depend on the presure differentials existing between their walls' inner and outer surfaces, on the viscosity and on the temperature of the fluid flowing therethrough, the amounts by which the resonant frequencies vary from corresponding center frequencies cannot readily be ascribed to definite causes and, hence, no simple mathematical relations relating the frequencies of the vibratory member with the properties of the fluid can be found; and (4) High pressures often cause the densimeter's parts to become damaged as a result of the high-pressure differentials to which they are subjected.

Accordingly, it is an object of the present invention to provide a densimetering system of the elastically suspended, vibratory member type capable of assuring precise density measurements of high-pressure fluids.

It is another object of this invention to provide a densimetering system of the above character capable of satisfactorily operating under unfavorable, environmental conditions.

It is a further object of the present invention to provide a densimetering system of the above character capable of providing density measurements substantially independent of the fluid's viscosity.

It is yet a further object of the invention to provide a new and improved density transducer especially adapted for use with the densimetering system of the above character, said transducer having an elastically suspended, vibratory member allowing therethrough the relatively unrestricted passage of the flowing fluid while being completely immersed in the fluid.

Broadly, the above and other apparent objects of the invention are accomplished by providing a densimetering system of the type adapted for telemetering the density of fluids, which includes a density transducer of the type employing a hollow member filled with the measured fluid and rigidly secured to at least one torsion shaft, and also employing electric means comprising an exciter and a detector, means including an amplifier coupled between the exciter and the detector for sustaining the resonant frequency of the hollow member about the torsion shaft, said frequency having a known simple relation as a function of the density of the measured fluid.

In accordance with a first characteristic of the transducer, the support for the torsion shaft is an envelope or conduit having an inlet and an outlet, and completely surrounding the hollow member. In accordance with a second characteristic, the wall of the hollow member is a surface of revolution, preferably cylindrical, about the torsion shaft and is connected to a center hub by radial blades whereby the flowing fluid can freely circulate between the blades. The torsion shaft has a low-valued thermoelastic coefficient and its ends are respectively rigidly secured to the center hubs of two grills forming the inlet to and the outlet from said conduit.

As a result of such a construction, the density transducer of the invention may be immersed in very high-pressure fluids without damaging the apparatus. Even though the wall of the hollow member is thin and of low inertia, it is not influenced by high-pressure fluids because it is completely immersed therein. For the same reason, the stiffness of the torsion shaft is also not affected by high-pressure fluids. Moreover, such a transducer offers to the fluid flow a minimum resistance inasmuch as the inlet and outlet grills may have large cross-sectional areas.

In accordance with a particular characteristic of the invention, the minimum distance between the external wall surface of the hollow member and the internal wall surface of its surrounding envelope should be maintained greater than one-half of the wave length of the oscillatory movement. As a result, the influence of the envelope's wall on the dynamic behavior of the vibratory member remains negligible. On the other hand, the viscous coupling between the vibratory member and the fluid may bceome appreciable.

In accordance with a further characteristic of the invention, means are provided in the loop circuit of the electromechanical oscillator, which means introduce a phase shift substantially equal to $\pi/4$ between the voltage generated by the detector winding and the voltage applied to the exciter winding. As an important result, the vibratory frequency as a function of density becomes substantially independent of the fluid's viscosity over a relatively wide range of viscosities.

In accordance with a yet further characteristic of the invention, the amplifying system in the loop circuit includes a preamplifying stage connected to the detector, a power amplifying stage feeding the exciter, and an automatic gain control or regulator network having one input connected to a reference source, and another of its inputs connected to the output of the preamplifier. The regulator is adapted to change the gain of the preamplifier in dependence upon the viscosity of the fluid. As a result, the signal delivered by the detector winding is of substantially constant amplitude. When this result is achieved, it will be shown that the amplitude of the current furnished to the exciter varies with the viscosity of the fluid. Hence by monitoring this current, measurements of the fluid's viscosity can be secured.

Further characteristics and objects of the invention will become apparent from the following description when taken in conjunction with the accompanying drawings in which:

FIG. 6 is a longitudinal view, partly in section, of a preferred embodiment of the transducer of FIG. 1 constructed in accordance with the invention;

FIG. 7 is a top view taken along line 7—7 in FIG. 6;

FIG. 8 is a top view taken along line 8—8 of FIG. 6; and

FIG. 9 is a schematic view illustrating the conversion from mechanical to electrical oscillations.

Figure 1:
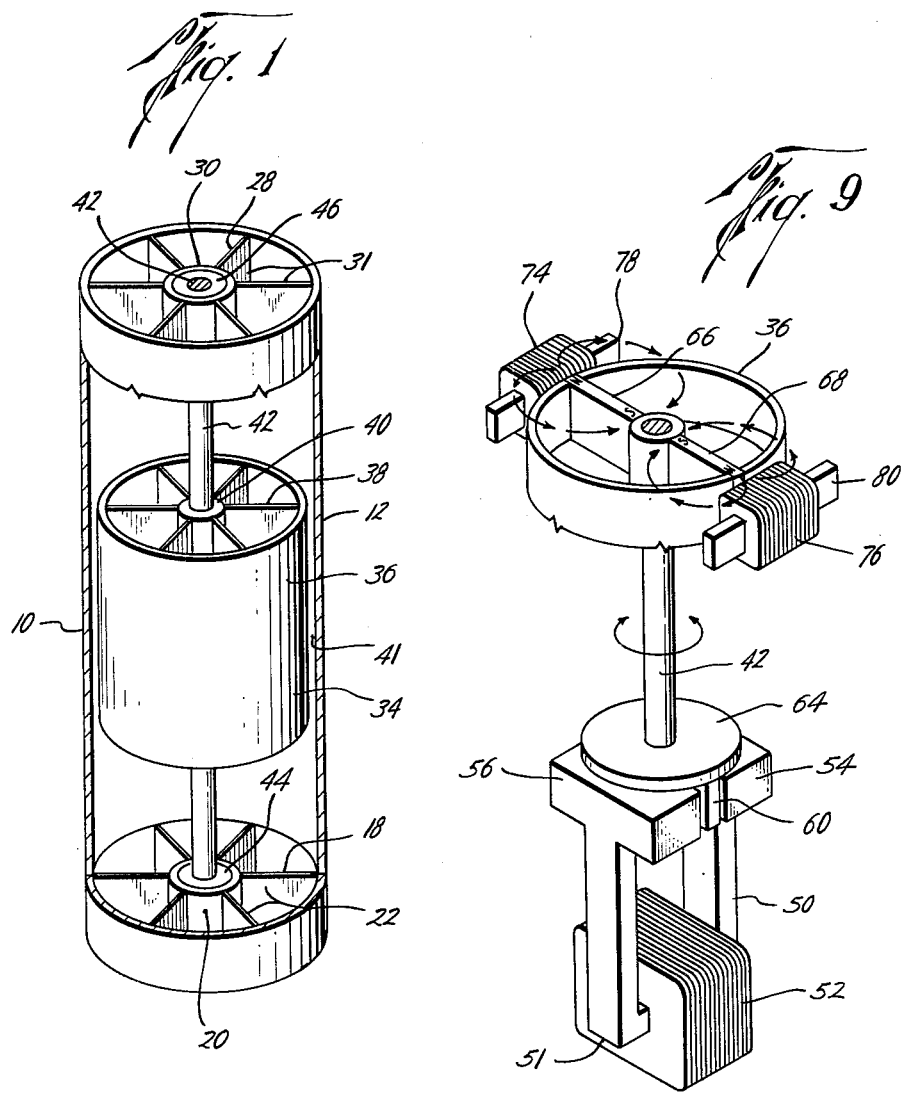
FIG. 1 is a perspective view, partly in section, of a simple density transducer useful in explaining the constructional principles of the invention.

The basic constructional principles of the density transducer or densimeter of the present invention can best be explained by reference to FIG. 1. The densimeter comprises movable or elastic parts, and stationary or inert parts.

The elastic parts constituting the density "sensor" include an elongated, hollow member 34 having a thin wall 36 and at least one torsion shaft 42. For ease of construction and simplicity of analysis, member 34 is preferably of cylindrical shape. Wall 36 is connected by radial blades 38 to a hub 40 fixedly secured to the median section of the centrally and longitudinaly mounted torsion shaft 42.

The inert parts include a support frame or casing 10, also of cylindrical shape, concentric with and surrounding the hollow member 34. A relatively unrestricted passage for the investigated fluid and a desired elastic stiffness are achieved by providing an inlet grill 18, formed of a center hub 20 connected by radially extended blades 22 to the envelope 10, and an outlet grill 28 formed of a center hub 30 also connected by radial blades 31 to the envelope 10. The ends of the torsion shaft 42 are centrally and fixedly mounted within hubs 20 and 30, respectively. The outer diameter of cylinder 34 is only silghtly smaller than the inner diameter of cylinder 10 so that the annular space 41 between cylinders 10, 34 has a gap on the order of 1.5 millimeters. Thus, cylinder 34 is completely immersed in the measured fluid.

Various means may be provided to exert a rotational torque on shaft 42 thereby setting the low-inertia cylinder 34 and shaft 42 in vibration. Because it is most frequently desired to establish a self-sustaining oscillatory system, one end of shaft 42 is made to act as the shaft of a motor and the other end as the shaft of a generator.

Figure 2:
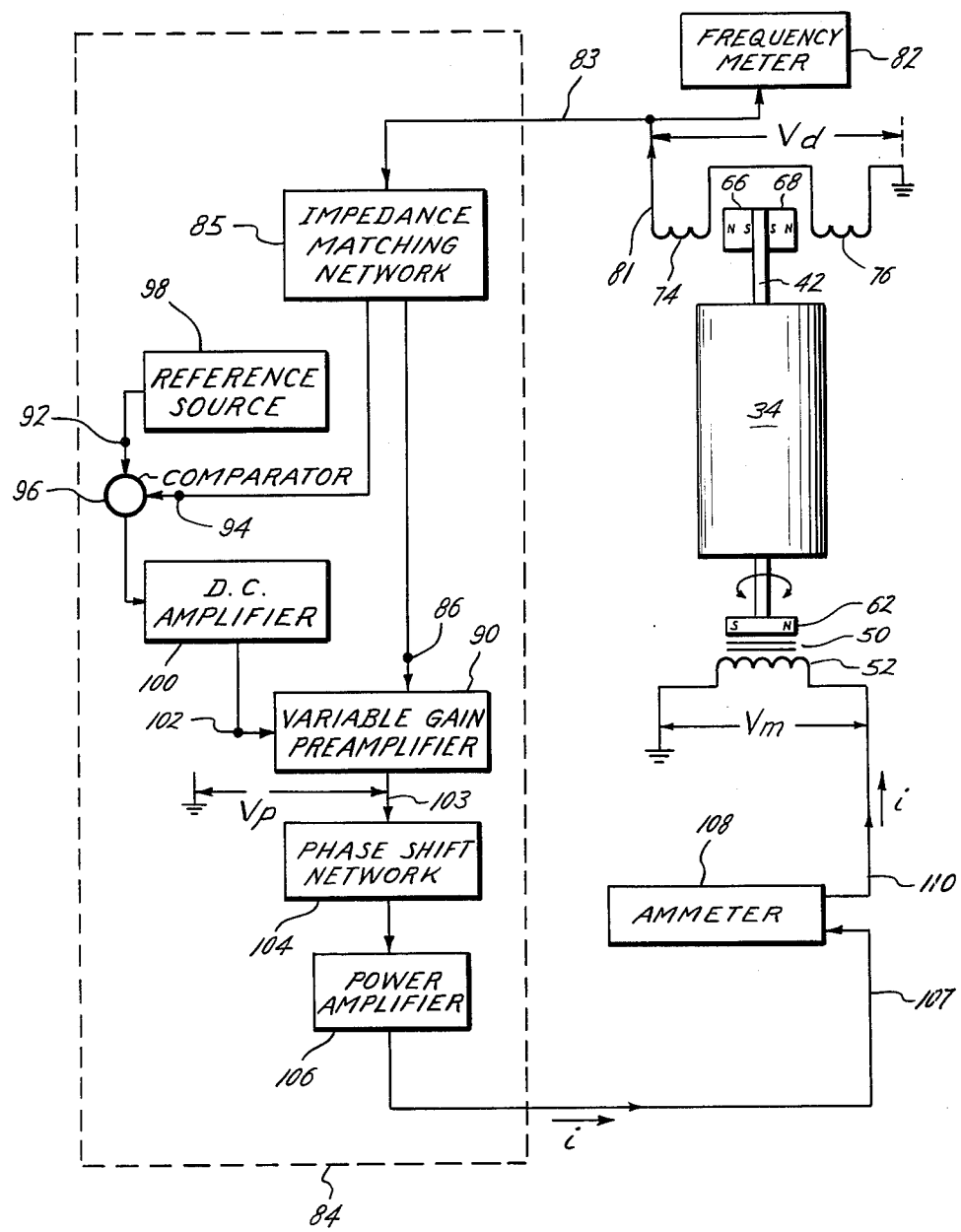
FIG. 2 is a schematic, block diagram of a preferred densimetering system employing the transducer of FIG. 1.

A schematic representation of the preferred electromagnetic arrangement coupled with the torsion shaft 42 is shown in FIG. 2.

The motor effect is achieved by making an electromagnet, comprising a core 50 carrying an excitation winding 52, act on a permanent magnet 62, coupled to one end of shaft 42. When the electromagnet is energized as by a sinusoidal current $i$, it is evident that a sinusoidal torsional torque $C_m$ is exerted on shaft 42 thereby imparting a sinusoidal, angular velocity $\omega$ to the hollow cylinder 34 about the shaft's axis.

The generator effect is achieved by allowing the magnetic flux emanating from a permanent magnet 66, coupled to the other end of shaft 42, to cut across the turns of a pickup or detection winding 74. As is well-known, the frequency $2nf$ of the signal induced in winding 74 is identical to the frequency $\omega$ of the sensor. Thus, by gradually varying the frequency of the applied alternating current, the sensor will resonate when the current's frequency becomes equal to the natural resonant frequency of the sensor.

The expression of the sensor's natural frequency is:

$$f = 2\pi \sqrt{\frac{\mu}{I}} \quad (1)$$

where $\mu$ = stiffness of the elastic system
$I$ = inertia of the elastic system.

Since $I$ is the sum of $I_0$ (inertia of the moving parts in vacuum) and a term proportional to $\rho$ (density of the entrained fluid), the above expression becomes:

$$f = 2\pi \sqrt{\frac{\mu}{I_0 + k\rho}} \text{ in fluid} \quad (2)$$

and $$f_0 = 2\pi \sqrt{\frac{\mu}{I_0}} \text{ in vacuum.} \quad (3)$$

Hence, $$\left(\frac{f_0}{f}\right)^2 = 1 + \alpha\rho \quad (4)$$

$\alpha$ and $h$ being constants of the system. The natural frequency $f$ of the sensor is thus a function of the fluid's density, assuming a perfect (nonviscous) fluid.

Fundamental Equation 4 very nearly holds when conduit 10 transmits gases. In the case of liquids, especially of the viscous type as those found in oil wells, Equation 4 would provide appreciable errors. For example, if Equation 4 is used to calculate the density of a known type oil, a $+15\%$ error can be expected. This error is due primarily to the viscosity of the fluid which manifests itself by increasing the inertia $I$ of the moving parts.

In accordance with the invention, the phase and amplitude of the excitation current $i$ are so modified as to automatically exert a torsional torque $C_m$ of such phase and amplitude that the sensor's frequency variation with viscosity remains negligible. As a corollary, since the amounts by which current $i$ must be modified to make $f$ independent of viscosity can be correlated for various viscosity values, it is possible by monitoring $i$ to secure information as to the viscosity of the investigated fluid. To better understand the influence of the viscous coupling upon the phenomenon of resonance, it will be helpful to first present an analysis of the operation of a conventional electromechanical oscillator.

Such an oscillator is governed by the following second-order differential equation:

$$I\frac{d^2\theta}{dt^2} + \frac{d\theta}{kdt} + \mu\theta = C_m \quad (5)$$

where $\theta$ = the angle of rotation of shaft 42
$k$ = the coefficient of friction
$\theta_0$ = maximum value of $\theta$
$C_m$ = the applied torsional torque.

For sinusoidal oscillations Equation 5 becomes:

$$I\omega^2\theta_0 - k\omega\theta_0 - \mu\theta_0 + C_m = 0 \quad (6)$$

where $$\omega^2 = \frac{\mu}{I}; \text{ and } C_m = K\omega\beta_0$$

Figure 3:
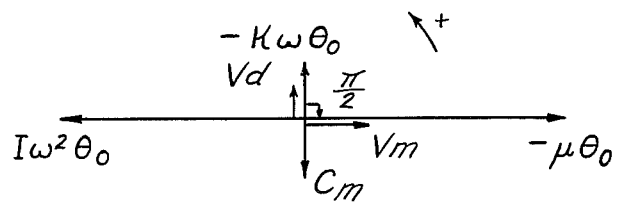
FIGS. 3 and 4 are vector diagrams useful in explaining the operation of FIG. 1.

FIG. 3 represents a vectorial diagram of Equation 6. As is known, the voltage $V_d$ provided by the terminals of the pickup winding 74 is in phase with $\omega$ and hence with the vector $(-k\omega\theta_0)$. In order for $f$ to have the same frequency as $\omega$, it is necessary that $i$ be in phase (to within $\pi$) with the torque $C_m$ and hence with the vector $(-k\omega\theta_0)$. Since excitation winding 52 has a high inductance, it follows that the voltage $V_m$ across winding 52 lags the current $i$ and, hence, $V_d$ by $\pi/2$.

The above analysis of the operation of an electromechanical oscillator of the general type is evidently quite different from the operation of the densimeter in accordance with this invention. As previously mentioned, the viscous coupling especially between the external surface of wall 36 and the investigated liquid modifies considerably the sensor's resonant frequency. On the other hand, a mathematical study of the resonance phenomenon indicates that the influence of the internal surface of the envelope 10 on the amplitude of the viscous coupling can be made negligible if the width of the annular space 41 is made greater than one-half of the wave length corresponding to $\omega$. For example, if the densimeter is employed to measure the density of petroleum products and if the width of the annular space 41 is approximately equal to 1.5 millimeters, then the required condition is satisfied. In fact, when the frequency of oscillation is on the order of 1 kilocycle, the maximum viscosity of encountered petroleum fluids is on the order of 2 poises, and their density is on the order of 0.8 grams per cubic centimeter, then the wave length of the corresponding vibratory movement is approximately equal to 1.8 millimeters. Hence 1.5 millimeters, being greater than one-half of 1.8, is a conservative number.

Figure 4:
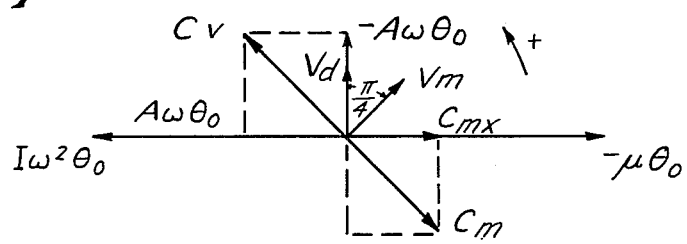

The negligible influence of the inner surface of envelope 10 on $\omega$ leads to a relatively simple mathematical expression for the viscous damping added to the external surface of wall 36 by the fluid within the annular space 41. As shown in the vectorial diagram of FIG. 4, this viscous damping manifests itself by a vector $C_v$ having two components, each of amplitude approximately equal to $|A\omega\theta_0|$; one component is in phase with the inertia vector $I\omega^2\theta_0$, and the other is in phase with the damping vector $(-k\omega\theta_0)$.

$$A = r^2 s \sqrt{\rho\omega\eta}$$

where $r$ = radius of cylinder 34
$s$ = external surface of revolution of wall 36
$\rho$ = density of measured fluid
$\eta$ = viscosity of measured fluid.

In general, the value of $(-k\omega\theta_0)$ can be made negligible compared to $A\omega\theta_0$. Obviously, if the output of the pickup winding 74 were coupled to the input of an amplifier feeding the excitation winding 52, then the appearance of the additional inertia factor $(A\omega\theta_0)$, dependent on the fluid's viscosity, would modify substantially the resonant frequency of the sensor immersed in the fluid, see Equation 4. Also, the additional damping component $(-A\omega\theta_0)$ in phase with $(-k\omega\theta_0)$ directly influences the stiffness $\mu$ of the sensor. As a result, the amplitude of the voltage $V_d$ appearing at the output terminals of the pickup winding 74 would be inversely proportional to $A$, if the applied torsional torque $C_m$ remained constant. In the system of this invention $C_m$ is increased so that $V_d$ remains substantially constant. By monitoring the current in winding 52 which is proportional to $C_m$, it is possible to also obtain an indication of the fluid's viscosity.

To that end, as shown in FIG. 2, the output signal $V_d$ is applied via lead 81 to a frequency meter 82 and to the input line 83 of an amplifying system boxed in with dotted lines and designated as 84. Amplifier 84, which feeds current $i$ corresponding to $V_d$, includes an impedance matching network 85 having two outputs; its first output is connected to the first input 86 of a wide-band preamplifier 90 of variable gain, and its second output is connected to the first input 94 of a comparator network 96, the latter also receiving at 92 a reference voltage signal provided by a reference signal source 98. The output of comparator 96 is applied to a D.C. amplifier 100 whose output is connected to the gain control terminal 102 of preamplifier 90. Because of the automatic gain control loop set up around preamplifier 90, it should be evident that the output signal $V_d$ on line 81 is substantially constant in amplitude.

Signal $V_p$ is applied to a phase-shift network 104 providing a 45° phase shift to the signals applied thereto. The output of the phase shifter 104 is coupled to a suitable power amplifier 106 whose output current $i$ on line 107 constitutes the output of amplifier 84. To obtain a measure of the fluid's viscosity, line 107 is connected to line 110 via an ammeter 108. Finally, line 110 is connected to the excitation winding 52 on the core 50.

Even without comparator 96 and amplifier 100, it will be evident that the amplifier 84 presents nevertheless an important difference in comparison with amplifiers heretofore employed for maintaining elastically suspended systems in vibration. From the previous mathematical analysis, as summarized by FIG. 4, it is apparent that the phase shift introduced in the amplifier 84 between the voltage $V_d$ applied to the pickup winding 74 and the voltage $V_m$ applied to the excitation winding 52 is no longer $\pi/2$, but $\pi/4$. This difference fundamentally modifies the operation of the electromechanical oscillator comprising the densimeter of this invention. The shifting by $\pi/4$ of signal $V_m$ and hence of $i$ ($V_m$ and $i$ are $\pi/2$ displaced) allows the torsional torque $C_m$ ($C_m$ and $i$ are in phase) to be substantially in phase (to within $\pi$) with the vector $C_v$ resulting from the viscous coupling. Consequently, the following relations obtain:

$$|I\omega^2\theta_0| = |\mu\theta_0|$$
$$|C_{mx}| = |A\omega\theta_0|$$
$$|C_{my}| = |A\omega\theta_0|$$

where $C_{mx}$ and $C_{my}$ are the horizontal and vertical components of $C_m$, respectively.

Under these conditions the oscillatory frequency $f$ is no longer affected by the additional inertia vector $A\omega\theta_0$ because to $C_m$ (of FIG. 3) is constantly added $C_{mx}$ equal and opposite to $A\omega\theta_0$. It will be remembered that $A\omega\theta_0$ is caused by the viscous coupling between the cylinder 34 and the fluid in which it is immersed. Consequently, the general Equation 4 is again controlling. As a corollary, the measurements made by the frequency meter 82 will be the same for fluids having the same densities even though their viscosities may be appreciably different.

In addition to introducing a $\pi/4$ phase shift, amplifier 84, causing the self-sustained electromechanical oscillations, differs from typically employed amplifiers for such systems in yet another important respect. As was mentioned previously, by using a typical amplifier the amplitude of the voltage $V_d$ would be inversely proportional to $A$ (because $C_m$ remains constant in conventional systems). To avoid an amplitude-modulated signal $V_d$, which is already frequency-modulated as a function of density, and to additionally obtain a second characteristic parameter of the investigated fluid, the signal $V_d$ is maintained substantially constant by the automatic gain control loop around preamplifier 90. To this end, in the comparator 96 the alternating signal $V_d$ is detected and filtered and then compared with the signal supplied by the reference source 98; any deviation from a preset value is amplified by the D.C. amplifier 100 to raise or lower the bias on the control electrode 102 of preamplifier 90. In this fashion, the gain of amplifier 84 is automatically controlled so that the amplitude of the current $i$ and, hence, of the coupling torque $C_m$ increases with the viscosity of the measured fluid. The measurement of the current intensity $i$ by the ammeter 108 yields, therefore, a value which is proportional to $\sqrt{\rho\omega\eta}$.

A direct consequence of the above is that the maximum measurable viscosity is determined by the maximum power deliverable by the power amplifier 106. Moreover, by combining the information provided by the frequency meter 82 and by the ammeter 108, it is possible to calculate not only the density, but also the viscosity of the fluid surrounding cylinder 34.

Figure 5:
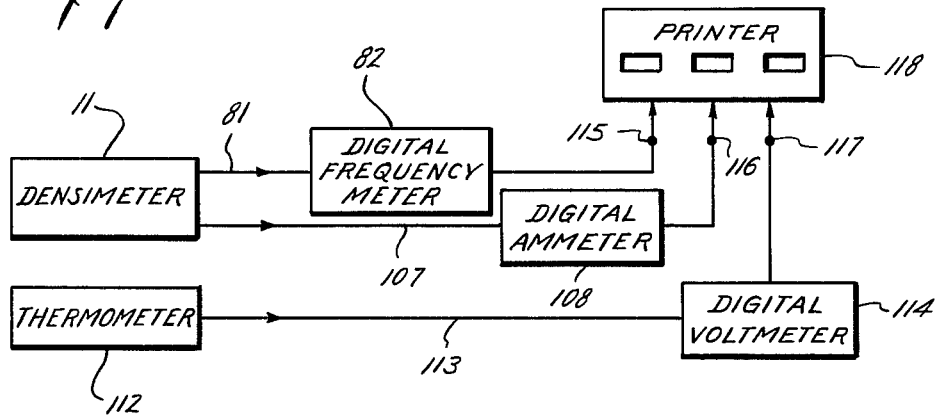
FIG. 5 is a block diagram of a measuring and recording system including the densimetering system of FIG. 2 and additional meters for providing simultaneous recordings of desirable characteristics of the investigated fluids.

In FIG. 5, wherein the same numerals refer to like parts, the densimetering system of the invention, generally designated as 11, has its conductor 81 connected to a digital frequency meter 82 adapted to furnish command signals to the first input 115 of an automatic printer 118; similarly, its conductor 107 is connected to a digital ammeter 108 equally adapted to furnish command signals to a second input 116 of printer 118. On the other hand, a thermometer 112, including, for example, a thermocouple followed by an amplifier, is coupled via a wire 113 to a digital voltmeter 114 adapted to furnish command signals to a third input 117 of printer 118.

It will be appreciated that FIG. 5 includes all the components of FIG. 2 with the addition of thermometer 112, digital voltmeter 114, and automatic printer 118. As a result of such an arrangement, the automatic printer 118 inscribes, in accordance with a predetermined cycle, the data relative, on one hand, to the density and the viscosity of the measured fluid and, on the other hand, to the temperature of the fluid at the instant of measurement. The knowledge of temperature, in fact, is a necessity because even at constant density and viscosity, temperature variations nevertheless affect the frequency and amplitude of $V_d$. More specifically, as a function of a temperature increase, on one hand, the cylinder 34 expands and the volume of fluid entrained in rotation by the blades 38 increases and, on the other hand, the coefficient of elasticity of the torsion shaft 42 is modified in spite of the fact that the shaft is preferably made of "Elinvar" having a small thermoelastic coefficient. However, to obtain precise density measurements, it is necessary to correct for the error caused by temperature even if the error is only on the order of 1% per 100° C. Thus the use of calibration curves or tables is recommended.

In sum, the densimetering system of the invention, when combined with a thermometer, provides even under the most severe environmental conditions three fundamental parameters: density, viscosity, and temperature which combinedly allow to determine with great precision the nature of the fluids transported by the conduit 10.

In FIG. 6 is shown a more practical embodiment of the densimeter shown in FIG. 1 which may be employed in the densimetering system of FIG. 2. To avoid a repetitious description of identical parts, in FIGS. 1 and 6 the same numerals refer to similar parts. The inert portion of the densimeter includes the conduit 10, which may be the envelope of a packer instrument, snuggly fitted around a cylindrical frame 12 preferably made of aluminum and secured to conduit 10 by two snap rings 14 and 16. The inlet grill 18 is made of fiber glass and its radial blades 22 are glued at 24 to the interior surface 26 of frame 12. The outlet grill 28 can be made of any suitable metal and is glued at 32 to the interior surface 26.

The elastic portion of the densimeter of the sensor includes the hollow cylinder 34, preferably made of a light, aluminum alloy to minimize its inertia, and the torsion shaft 42, preferably made of "Elinvar" to lower its thermoelastic coefficient. The ends 44 and 46 of shaft 42 are respectively fixedly secured to the centers of hubs 20 and 30 of grills 18 and 28. A number (typically six) of radial blades 38 connect the hub 40, fixedly secured to or forming integral part with the shaft 42, to the internal surface of the thin wall 36 of cylinder 34. Blades 38 may be made of the same material as cylinder 34. For reasons previously explained, it is preferred that the air gap 41 between the outer surface of wall 36 and the inner surface 26 of envelope 12 be on the order of 1.5 millimeters.

To the lower end of hub 40 is secured a conically shaped, low-inertia support member 48 to which is glued or epoxy-bonded at 62 a magnetic disk 64 carrying two permanent, ceramic magnets 58 and 60 having, respectively, north and south polarities, as better shown in FIG. 7. The magnetic core 50, carrying the excitation winding 52, is laminated and is properly secured to the hub 20 of grill 18. Because grill 18 is of fiber glass, the eddy current losses are at a minimum. Core 50 has a flat portion 51 in a transversal plane and two longitudinally extending U-shaped arms 54 and 56 parallel to each other and symmetrically disposed relative to shaft 42. Magnets 58 and 60 are disposed between the U-shaped poles 54 and 56. The air gap between poles 54, 56 and magnets 58, 60 is on the order of 1 millimeter; as a result, the instrument is practically insensitive to dirt particles. The U-shaped poles 54 and 56 concentrate the magnetic field, created by the alternating current in the excitation winding 52, between the space occupied by magnets 58 and 60.

When the excitation coil 52 is energized by an alternating current $i$, the resulting alternating magnetic field acts, in a known manner, on permanent magnets 58 and 60 causing a torque $C_m$ to become exerted on shaft 42.

To convert the alternating mechanical rotations into an alternating electrical signal, two flat, ceramic magnets 66 and 68 are secured to two diametrically disposed blades 38 as shown in FIG. 8. Each of magnets 66 and 68 is radially polarized so that the north pole is adjacent to wall 36 of cylinder 34 and the south pole is adjacent to hub 40. Respectively facing magnets 66, 68 are, in frame 12, two wide openings 70, 72 respectively provided with flat portions 71 and 73. Respectively fastened to the flat portions 71, 73 are two flat, magnetic bars 78, 80. A detection winding 74 is wound on bar 78 and a similar winding 76 is wound on bar 80. Windings 74, 76 are preferably connected in series-circuit relationship. Opposite to the longitudinal center of cylinder 34, between conduit 10 and envelope 12, is housed a cylindrical magnetic shield 81. By setting the axes of detection coils 74, 76 parallel to the axis of excitation coil 52, direct magnetic induction therebetween is reduced to a minimum. The magnetic shield 81 further tends to reduce spuriously induced signals in windings 74, 76.

It will be evident from FIG. 9 that when cylinder 34 moves, the magnetic flux lines emanating from permanent magnets 66 and 68 respectively intersect coils 74 and 76 thereby inducing a resultant voltage $V_d$ therein proportional to the angular velocity of shaft 42.

In sum by measuring the frequency of signal $V_d$, a precise measurement of the density of the fluid flowing through cylinder 34 is obtained. When the fluid is a gas, relatively negligible viscous friction is experienced by the sensor. For a liquid the viscous friction is appreciable, and the automatic gain control provided for preamplifier 90 increases the current $i$, supplied to the excitation winding 52, by an amount sufficient to compensate for the additional load imposed on the sensor by the liquid. By providing, if necessary, a 45° phase shift in amplifier 84, the sensor oscillates at a frequency substantially independent of the viscosity of the fluid. As a result, the general law expressed by Equation 4 governs the operation of the densimeter of this invention for liquids as well as for gases. Finally, because the elastic and inert portions of the densimeter are separate (the purpose of the inert portion being only to drive the fluid into rotary motion), the densimeter is pressure-balanced and the derived frequency measurements are independent of differential pressures.

Having thus described my invention with particular reference to the preferred forms thereof and having shown and described certain modifications, it will be obvious to those skilled in the art to which the invention pertains, after understanding my invention, that various changes and other modifications may be made therein without departing from the spirit and scope of my invention, as defined by the claims appended hereto.

What is claimed is:

1. A density transducer for providing an alternating electrical signal having a frequency which is variable in a known manner with the density of a fluid, a hollow member having a thin wall, the external surface of which is a surface of revolution, a torsion shaft axially mounted in said hollow member, radially extending blades fixedly securing the inner wall of said hollow member to said shaft; a hollow casing completely enclosing said member whereby an annular gap is formed between the external surface of said hollow member and the internal surface of said casing, said gap having a width greater than one-half of the wave length corresponding to said alternating signal; means fixedly securing the ends of said shaft to said casing whereby said fluid can freely flow through said casing, said means, and said hollow member; an exciter exerting an alternating torque on said shaft thereby imparting a relative alternating velocity between said member and said casing, a detector responsive to said relative velocity for providing said variable frequency electrical signal, and an amplifier having an input circuit coupled to said detector and an output circuit coupled to said exciter for maintaining said relative velocity.

2. In a density transducer providing an alternating electrical signal having a frequency which is variable in a known manner with the density of a fluid, a hollow member, the external surface of which is a surface of revolution, a torsion shaft axially mounted in said hollow member, radially extended blades fixedly securing the inner wall of said hollow member to said shaft, a hollow casing completely enclosing said member; means fixedly securing at least one end of said shaft to said casing whereby said fluid can freely flow through said casing, said means, and said hollow member; an exciter including a magnetic core and an excitation winding wound around said core, said core including a transversal base and at least two arms extending from said base, said arms being symmetrically disposed about the axis of said shaft, and a permanent magnet fixedly coupled to said shaft, said magnet being disposed in the gap between said arms whereby an alternating torque is exerted on said shaft in response to an alternating current applied to said excitation winding; a detector responsive to the displacements of said shaft for providing said variable frequency electrical signal, and an amplifier having an input circuit coupled to said detector and an output circuit coupled to said excitation winding for providing thereto said alternating current.

3. The transducer of claim 2 wherein said detector includes two permanent magnets mounted on two opposite radial blades of said hollow member and two detection windings connected in series, and a magnetic bar secured to said casing, said windings being wound on said magnetic bar.

4. A density transducer for measuring the density of a fluid flowing through a casing and for providing an alternating electrical signal having a frequency which is variable in a known manner with the density of said fluid, said transducer comprising in combination:

a hollow, cylindrical member, torsion means including a torsion shaft for axially mounting said hollow member for oscillation in said casing, said hollow member having an outer diameter smaller than the inner diameter of said casing whereby said fluid can freely flow through and around said hollow member, at least one radial blade coupling said hollow member to said shaft, torque producing means including an exciter for exerting an alternating torque on said shaft thereby imparting a relative alternating velocity between said casing and said hollow member, electric signal generating means including a detector responsive to said relative velocity for providing said alternating electrical signal, and means responsive to the frequency of said alternating electrical signal, said frequency being indicative of the density of said fluid.

5. A density transducer for measuring the density of a fluid flowing through a cylindrical casing and for providing an alternating electrical signal having a frequency which is variable in a known manner with the density of said fluid, said transducer comprising in combination:

a hollow, cylindrical member, torsion means including a torsion shaft for axially mounting said hollow member for oscillation in said casing, said hollow member having an outer diameter smaller than the inner diameter of said casing whereby said fluid can freely flow through and around said hollow member, at least one radial blade coupling said hollow member to said shaft, torque producing means including an exciter for exerting an alternating torque on said shaft thereby imparting a relative alternating velocity between said casing and said hollow member, electric signal generating means including a detector responsive to said relative velocity for providing said alternating electrical signal, an amplifier having an input circuit coupled to said signal generating means and an output circuit coupled to said torque producing means for feeding energy to said exciter thereby maintaining said relative velocity, and means responsive to the frequency of said alternating electrical signal, said frequency being indicative of the density of said fluid.

6. The densimetering system of claim 5, wherein said amplifier further includes a phase shifter for providing a phase shift approximately equal to 45° between the signal applied to said exciter and the signal derived from said detector.

7. The density transducer of claim 5 wherein said amplifier further includes a phase shifter for providing a phase shift approximately equal to 45° between the signal applied to said exciter and the signal derived from said detector.

8. The density transducer of claim 5 wherein said amplifier includes automatic gain control means for maintaining substantially constant the amplitude of the signal at the output of said detector, said automatic gain control means comprising: a comparator for comparing the amplitude of the output signal of said detector with a reference voltage, and a variable gain preamplifier the gain of which is dependent on the output of said comparator.

9. The density transducer of claim 8 and further including a current meter coupled between said amplifier and said exciter, the information provided by said current meter being related in a known manner with the viscosity of said fluid; a temperature transducer coupled with said fluid, and an automatic recorder accepting the output of said frequency meter, the output of said current meter and the output of said temperature transducer.

References Cited by the Examiner

UNITED STATES PATENTS

| | | | |
|---|---|---|---|
| 2,354,923 | 8/1944 | McNamee | 73—32 |
| 2,358,374 | 9/1944 | Ashcraft | 73—32 |
| 2,550,052 | 4/1951 | Fay | 73—59 |
| 2,696,735 | 12/1954 | Woodward | 73—59 |
| 2,707,391 | 5/1955 | McSkimin | 73—59 |
| 2,759,355 | 8/1956 | Boyle et al. | 73—59 |
| 2,889,702 | 6/1959 | Brooking | 73—32 |

RICHARD C. QUEISSER, *Primary Examiner.*